US012287660B2

(12) United States Patent
Chen

(10) Patent No.: US 12,287,660 B2
(45) Date of Patent: Apr. 29, 2025

(54) LOW-DROPOUT REGULATOR CIRCUIT WITH HIGH LOOP STABILITY BASED ON LOAD-DEPENDENT ZERO MOBILE COMPENSATION AND METHOD THEREOF

(71) Applicant: BEIJING TONGXIN TECHNOLOGY CO., LTD, Beijing (CN)

(72) Inventor: Bingjie Chen, Beijing (CN)

(73) Assignee: BEIJING TONGXIN TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 18/576,366

(22) PCT Filed: Aug. 24, 2022

(86) PCT No.: PCT/CN2022/114424
§ 371 (c)(1),
(2) Date: Jan. 4, 2024

(87) PCT Pub. No.: WO2024/031742
PCT Pub. Date: Feb. 15, 2024

(65) Prior Publication Data

US 2025/0085733 A1 Mar. 13, 2025

(30) Foreign Application Priority Data

Aug. 9, 2022 (CN) ......................... 202210953031.3

(51) Int. Cl.
*G05F 1/575* (2006.01)
*G05F 1/565* (2006.01)

(52) U.S. Cl.
CPC .............. *G05F 1/575* (2013.01); *G05F 1/565* (2013.01)

(58) Field of Classification Search
CPC ............. G05F 1/575; G05F 1/565; G05F 1/56
See application file for complete search history.

(56) References Cited

U.S. PATENT DOCUMENTS 10,234,883 B1 * 3/2019 Du .......................... G05F 1/575
2012/0126760 A1 * 5/2012 Vemula ................... G05F 1/575
323/271

(Continued)

FOREIGN PATENT DOCUMENTS

CN 102541134 7/2012
CN 106155162 11/2016

(Continued)

OTHER PUBLICATIONS

"International Search Report (Form PCT/ISA/210) of PCT/CN2022/114424", mailed on Dec. 29, 2022, pp. 1-4.

(Continued)

*Primary Examiner* — Jue Zhang
*Assistant Examiner* — Jye-June Lee
(74) *Attorney, Agent, or Firm* — JCIPRNET

(57) ABSTRACT

Provided is a low-dropout regulator circuit with high loop stability based on a load-dependent zero mobile compensation and a method thereof. The LDO circuit with high loop stability comprises a LDO circuit body, the LDO circuit body includes a PMOS transistor; the LDO circuit with high loop stability comprises a dynamic-resistance-boosting-circuit adaptively connected with the PMOS transistor, a dynamically variable resistor in parallel with PMOS transistor is generated according to the state of the load by the dynamic-resistance-boosting-circuit; the dynamically variable resistor is connected in parallel with PMOS transistor following the load variations to form a load equivalent resistor, a value for the formed load equivalent resistor is less than an equivalent resistance maximum value for PMOS transistor in a stable loop state, so that a high frequency pole (Continued)

frequency of the LDO circuit body is greater than a unit gain frequency of the LDO circuit body.

10 Claims, 4 Drawing Sheets

(56) References Cited

U.S. PATENT DOCUMENTS

| | | | | |
|---|---|---|---|---|
| 2015/0116038 | A1 | 4/2015 | Kujala | |
| 2017/0371364 | A1 | 12/2017 | Vareljian et al. | |
| 2018/0046212 | A1* | 2/2018 | Ming | G05F 1/575 |
| 2022/0206521 | A1* | 6/2022 | Choi | G05F 1/575 |

FOREIGN PATENT DOCUMENTS

| | | |
|---|---|---|
| CN | 109116906 | 1/2019 |
| CN | 111367345 | 7/2020 |
| CN | 113342110 | 9/2021 |

OTHER PUBLICATIONS

"Written Opinion of the International Searching Authority (Form PCT/ISA/237) of PCT/CN2022/114424", mailed on Dec. 29, 2022, pp. 1-3.

* cited by examiner

LOW-DROPOUT REGULATOR CIRCUIT WITH HIGH LOOP STABILITY BASED ON LOAD-DEPENDENT ZERO MOBILE COMPENSATION AND METHOD THEREOF

CROSS-REFERENCE TO RELATED APPLICATION

This application is a 371 of international application of PCT application serial no. PCT/CN2022/114424, filed on Aug. 24, 2022, which claims the priority benefit of China application no. 202210953031.3, filed on Aug. 9, 2022. The entirety of each of the above mentioned patent applications is hereby incorporated by reference herein and made a part of this specification.

1. TECHNICAL FIELD

The present disclosure provides a low-dropout regulator circuit with high loop stability based on a load-dependent zero mobile compensation and a method thereof, and belongs to the technical field of circuits and electronics.

2. DESCRIPTION OF RELATED ART

LDO (Low-dropout regulator) is widely used in mobile devices, industrial controls, and automobiles. Specifications for evaluating the LDO are divided into: 1) static-state specification; 2) dynamic-state specification, and 3) high-frequency specification, and the loop stability belongs to the static-state specification.

At present, many compensation methods have been used in the loop compensation for LDO, such as the frequency compensation method by utilizing cascode-miller, the frequency compensation method by using damping-factor-control and the frequency compensation method by using load-dependent zero mobile compensation. Among them, the load-dependent zero mobile compensation (LZMC) is widely used in the loop stability design of LDO due to its simple structure.

Zero points that vary with the load can be generated at the on-chip nodes by the load-dependent zero mobile compensation, enabling the entire LDO loop to be stable. In practical applications, when the load varies little, the load-dependent zero mobile compensation has a good effect of loop stability compensation. However, when the load varies greatly, unrecoverable oscillations of the LDO output voltages are currently generated, which exists in most LDOs, thus limiting the load response ability of the LDO circuit.

SUMMARY

The present disclosure provides a low-dropout regulator circuit with high loop stability based on a load-dependent zero mobile compensation and a method thereof, which can permanently maintain the loop stability, improve the load response ability, and maintain safety and reliability, when the load-dependent zero mobile compensation is adopted and the load undergoes significant and drastic variations, to solve the problems of generating unrecoverable oscillations of the LDO output voltage in the traditional LDO circuit in prior art, the adopted technical solutions are as follows.

Provided is a low-dropout regulator circuit with high loop stability based on a load-dependent zero mobile compensation, the LDO circuit with high loop stability comprises a LDO circuit body based on the load-dependent zero mobile compensation, the LDO circuit body includes a PMOS transistor MP6 configured to follow the load variations; the LDO circuit with high loop stability further comprises a dynamic-resistance-boosting-circuit adaptively connected with the PMOS transistor MP6, for a load adaptively connected to the LDO circuit body, varying states of the load are represented according to a source-drain dropout voltage between a source terminal of the PMOS transistor MP6 and a drain terminal of the PMOS transistor MP6, when the represented varying state of the load is matched with a preset load varying threshold in the dynamic-resistance-boosting-circuit, a dynamically variable resistor in parallel with the PMOS transistor MP6 is generated according to the varying states of the load by the dynamic-resistance-boosting-circuit.

The dynamically variable resistor is connected in parallel with the PMOS transistor MP6 following the load variations and acting as a resistor to form a load equivalent resistor, a value for the formed load equivalent resistor is less than an equivalent resistance maximum value for the PMOS transistor MP6 in a stable loop stable, so that a high frequency pole frequency of the LDO circuit body is greater than a unit gain frequency of the LDO circuit body.

Further, when the varying state of the load represented according to the source-drain dropout voltage is less than the preset load varying threshold in the dynamic-resistance-boosting-circuit, the PMOS transistor MP6 is in a linear operating region, and a dynamically variable resistor in a state of high resistance is generated according to the varying state of the load in the dynamic-resistance-boosting-circuit; a resistance value for the dynamically variable resistor generated in the dynamic-resistance-boosting-circuit is much greater than a linear region resistance value for the PMOS transistor MP6 in the linear operating region.

Further, the dynamic-resistance-boosting-circuit includes a NMOS transistor MN4, an input terminal Input of the dynamic-resistance-boosting-circuit is formed by a gate terminal of the NMOS transistor MN4, and the input terminal Input of the dynamic-resistance-boosting-circuit is adaptively connected to the drain terminal of the PMOS transistor MP6.

A source terminal of the NMOS transistor MN4 is connected to a positive terminal of a current source I0 and a first terminal of a resistance R0, a negative terminal of the current source I0 is grounded or floated on the ground, a drain terminal of a NMOS transistor MN1 is connected to an input voltage VIN, a positive terminal of a current source I1, a first terminal of a resistance R3, a source terminal of a PMOS transistor MP10, and a source terminal of a PMOS transistor MP11.

A negative terminal of the current source I1 is connected to a second terminal of the resistance R0 and a gate terminal of a PMOS transistor MP7; a source terminal of the PMOS transistor MP7 is connected to a second terminal of the resistance R3; a drain terminal of the PMOS transistor MP7 is connected to a drain terminal of a PMOS transistor MP8, a gate terminal of the PMOS transistor MP8 and a gate terminal of a PMOS transistor MP9, and both a source terminal of the PMOS transistor MP8 and a source terminal of the PMOS transistor MP9 are grounded; a drain terminal of the PMOS transistor MP9 is connected to a drain terminal of a PMOS transistor MP10, a gate terminal of the PMOS transistor MP10 and a gate terminal of a PMOS transistor MP11; an output terminal Output of the dynamic-resistance-boosting-circuit is formed by a drain terminal of the PMOS transistor MP11, and the output terminal Output of the dynamic-resistance-boosting-circuit is adaptively connected to the drain terminal of the PMOS transistor MP6.

Further, the preset load varying threshold is I1*R0, and when the represented varying state of the load is matched with the preset load varying threshold in the dynamic-resistance-boosting-circuit, the source-drain dropout voltage is greater than or equal to I1*R0.

Further, the LDO circuit body includes a compensation capacitor Cc connected with the drain terminal of the PMOS transistor MP6, one terminal of the compensation capacitor Cc is connected to the dynamic-resistance-boosting-circuit and the drain terminal of the PMOS transistor MP6, and another terminal of the compensation capacitor Cc is connected to an output terminal of a main operational amplifier OPA and an input terminal of a buffer Buffer.

The gate terminal of the PMOS transistor MP6 is connected to a gate terminal of a PMOS transistor MP5, a drain terminal of the PMOS transistor MP5, a positive terminal of a bias current source IBIAS and a drain terminal of a NMOS transistor MN3; both a negative terminal of the bias current source IBIAS and a source terminal of the NMOS transistor MN3 are grounded.

A gate terminal of the NMOS transistor MN3 is connected to a gate terminal of a NMOS transistor MN1, a gate terminal of a NMOS transistor MN2, a drain terminal of the NMOS transistor MN2 and a drain terminal of a PMOS transistor MP3, and a source terminal of the NMOS transistor MN2 and a source terminal of the NMOS transistor MN1 are grounded; a drain terminal of the NMOS transistor MN1 is connected to a drain terminal of a PMOS transistor MP4, a gate terminal of the PMOS transistor MP4 and a gate terminal of the PMOS transistor MP3.

A source terminal of the PMOS transistor MP3 is connected to a drain terminal of a PMOS transistor MP2; a source terminal of the PMOS transistor MP4 is connected to a drain terminal of a PMOS transistor MP1 and a first terminal of a resistance R1; the source terminal of the PMOS transistor MP4 is connected with the drain terminal of the PMOS transistor MP1 and the first terminal of the resistor R1 to form an output terminal VOUT of the LDO circuit body. A second terminal of a resistor R2 is connected to an in-phase terminal of the main operational amplifier OPA and one terminal of the resistor R2, and another terminal of the resistor R2 is grounded.

An output terminal of the buffer Buffer is connected to a gate terminal of the PMOS transistor MP2 and a gate terminal of the PMOS transistor MP1, and a reverse-phase terminal of the main operational amplifier OPA is connected to a reference voltage VREF.

Further provided is a method of a low-dropout regulator circuit with high loop stability based on a load-dependent zero mobile compensation. The method provides a LDO circuit body based on the load-dependent zero mobile compensation, the LDO circuit body includes a PMOS transistor MP6 configured to follow load variations. The method further comprises the following steps. A dynamic-resistance-boosting-circuit adaptively connected with PMOS transistor MP6 is provided, for the load adaptively connected to the LDO circuit body, varying states of the load are represented according to a source-drain dropout voltage between a source terminal of PMOS transistor MP6 and a drain terminal of the PMOS transistor MP6; when the represented varying state of the load is matched with a preset load varying threshold in the dynamic-resistance-boosting-circuit, a dynamically variable resistor in parallel with the PMOS transistor MP6 is generated according to the varying state of the load by the dynamic-resistance-boosting-circuit.

The dynamically variable resistor is connected in parallel with the PMOS transistor MP6 following the load variations and acting as a resistor to form a load equivalent resistor, a value for the formed load equivalent resistor is less than an equivalent resistance maximum value for the PMOS transistor MP6 in a stable loop stable, so that a high frequency pole frequency of the LDO circuit body is greater than a unit gain frequency of the LDO circuit body Further, when the varying state of the load represented according to the source-drain dropout voltage is less than the preset load varying threshold in the dynamic-resistance-boosting-circuit, the PMOS transistor MP6 is in a linear operating region, and a dynamically variable resistor in a state of high resistance is generated according to the varying state of the load in the dynamic-resistance-boosting-circuit.

The resistance value for the dynamically variable resistor generated in the dynamic-resistance-boosting-circuit is much greater than a linear region resistance value for PMOS transistor MP6 in the linear operating region.

Further, the dynamic-resistance-boosting-circuit includes a NMOS transistor MN4, an input terminal Input of the dynamic-resistance-boosting-circuit is formed by a gate terminal of the NMOS transistor MN4, and the input terminal Input of the dynamic-resistance-boosting-circuit is adaptively connected to the drain terminal of the PMOS transistor MP6.

A source terminal of the NMOS transistor MN4 is connected to a positive terminal of a current source I0 and a first terminal of a resistance R0, a negative terminal of the current source I0 is connected to a ground or floating on the ground, a drain terminal of a NMOS transistor MN1 is connected to an input voltage VIN, a positive terminal of a current source I1, a first terminal of a resistance R3, a source terminal of a PMOS transistor MP10, and a source terminal of a PMOS transistor MP11.

A negative terminal of the current source I1 is connected to a second terminal of the resistance R0 and a gate terminal of a PMOS transistor MP7; a source terminal of the PMOS transistor MP7 is connected to a second terminal of the resistance R3; a drain terminal of the PMOS transistor MP7 is connected to a drain terminal of a PMOS transistor MP8, a gate terminal of the PMOS transistor MP8 and a gate terminal of a PMOS transistor MP9, and both a source terminal of the PMOS transistor MP8 and a source terminal of the PMOS transistor MP9 are grounded; a drain terminal of the PMOS transistor MP9 is connected to a drain terminal of a PMOS transistor MP10, a gate terminal of the PMOS transistor MP10 and a gate terminal of a PMOS transistor MP11; an output terminal Output of the dynamic-resistance-boosting-circuit is formed by a drain terminal of the PMOS transistor MP11, and the output terminal Output of the dynamic-resistance-boosting-circuit is adaptively connected to the drain terminal of the PMOS transistor MP6.

Further, the preset load varying threshold is I1*R0, and when the represented varying state of the load is matched with the preset load varying threshold in the dynamic-resistance-boosting-circuit, the source-drain dropout voltage is greater than or equal to I1*R0.

Further, the LDO circuit body includes a compensation capacitor Cc connected with the drain terminal of the PMOS transistor MP6, one terminal of the compensation capacitor Cc is connected to the dynamic-resistance-boosting-circuit and the drain terminal of the PMOS transistor MP6, and another terminal of the compensation capacitor Cc is connected to an output terminal of a main operational amplifier OPA and an input terminal of a buffer Buffer.

The gate terminal of PMOS transistor MP6 is connected to a gate terminal of a PMOS transistor MP5, a drain terminal of the PMOS transistor MP5, a positive terminal of a bias current source IBIAS and a drain terminal of a NMOS transistor MN3, a negative terminal of the bias current source IBIAS and a source terminal of the NMOS transistor MN3 are grounded.

A gate terminal of the NMOS transistor MN3 is connected to a gate terminal of a NMOS transistor MN1, a gate terminal of a NMOS transistor MN2, a drain terminal of the NMOS transistor MN2 and a drain terminal of a PMOS transistor MP3, and a source terminal of the NMOS transistor MN2 and a source terminal of the NMOS transistor MN1 are grounded; a drain terminal of the NMOS transistor MN1 is connected to a drain terminal of a PMOS transistor MP4, a gate terminal of the PMOS transistor MP4 and a gate terminal of the PMOS transistor MP3.

A source terminal of the PMOS transistor MP3 is connected to a drain terminal of a PMOS transistor MP2; a source terminal of the PMOS transistor MP4 is connected to a drain terminal of a PMOS transistor MP1 and a first terminal of a resistance R1; the source terminal of the PMOS transistor MP4 is connected with the drain terminal of the PMOS transistor MP1 and the first terminal of the resistor R1 to form an output terminal VOUT of the LDO circuit body. A second terminal of a resistor R2 is connected to an in-phase terminal of the main operational amplifier OPA and one terminal of the resistor R2, and another terminal of the resistor R2 is grounded.

An output terminal of the buffer Buffer is connected to a gate terminal of the PMOS transistor MP2 and a gate terminal of the PMOS transistor MP1, and a reverse-phase terminal of the main operational amplifier OPA is connected to a reference voltage VREF.

DESCRIPTION OF THE EMBODIMENTS

Preferred embodiments of the present disclosure are described as follows in conjunction with the drawings, it should be understood that the preferred embodiments described herein are merely intended to illustrate and explain the present disclosure and are not intended to limit the present disclosure.

Figure 3:
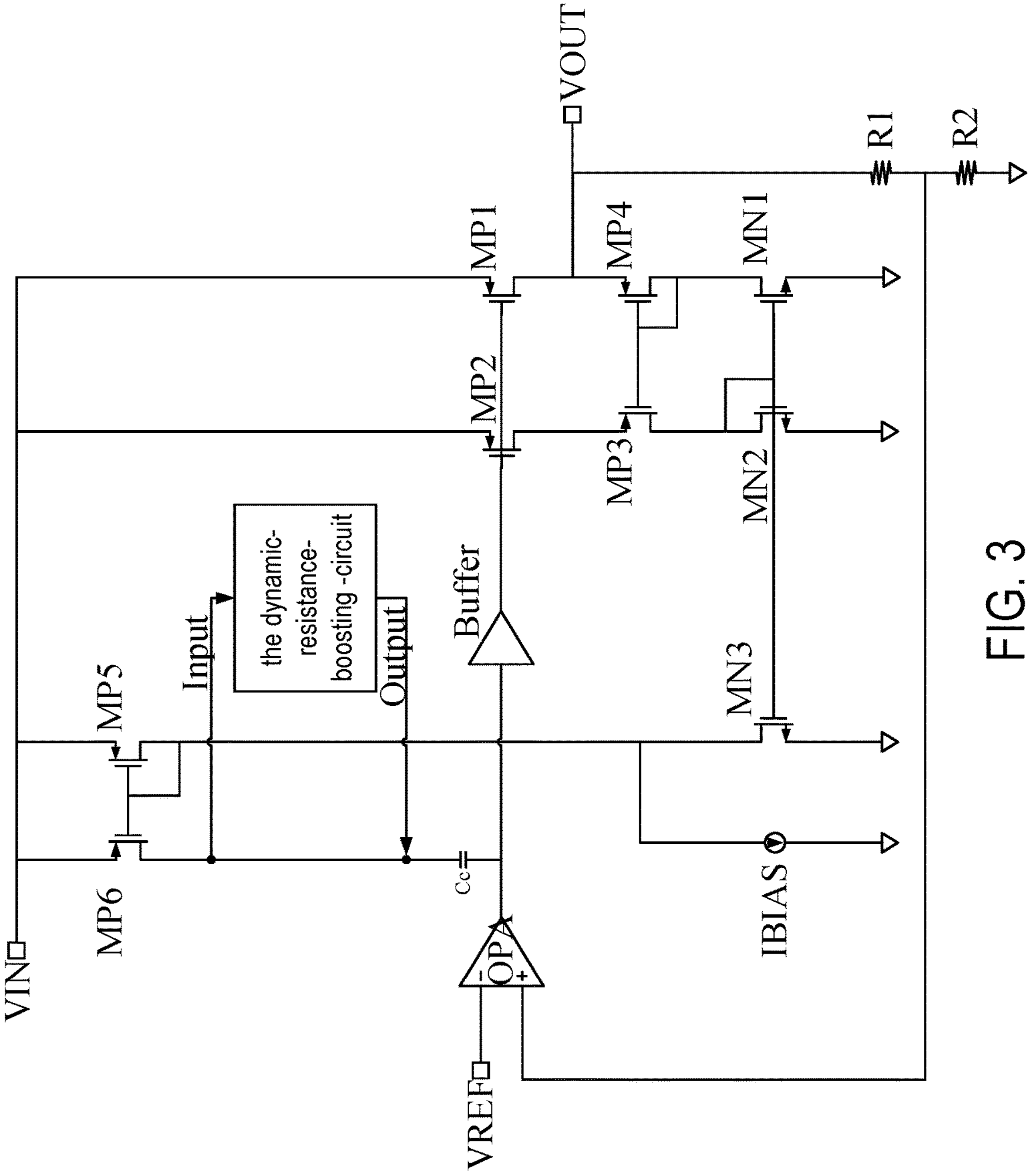
FIG. 3 illustrates a circuit schematic diagram of the LDO circuit in the present disclosure.

As illustrated in FIG. 3, when the load-dependent zero mobile compensation is adopted and the load varies dramatically, in order to permanently maintain the loop stability and improve the load response ability, the present disclosure comprises an LDO circuit body based on the load-dependent zero mobile compensation, and the LDO circuit body includes the PMOS transistor MP6 configured to follow the load variations.

The present disclosure further comprises a dynamic-resistance-boosting-circuit which is adaptively connected with the PMOS transistor MP6. For the load adaptively connected to the LDO circuit body, varying states of the load are represented according to a source-drain dropout voltage between a source terminal of the PMOS transistor MP6 and a drain terminal of the PMOS transistor MP6. When the represented varying state of the load is matched with a preset load varying threshold in the dynamic-resistance-boosting-circuit, a dynamically variable resistor in parallel with the PMOS transistor MP6 is generated according to the varying states of the load by the dynamic-resistance-boosting-circuit.

The dynamically variable resistor is connected in parallel with the resistor followed by the PMOS transistor MP6 and acting as a resistor to form a load equivalent resistor, the value for the formed load equivalent resistor is less than an equivalent resistance maximum value for the PMOS transistor MP6 in a stable loop state, so that a high frequency pole frequency of the LDO circuit body is greater than a unit gain frequency of the LDO circuit body.

Specifically, a loop compensation form of the load-dependent zero mobile compensation is adopted in the LDO circuit body. The specific situation of LDO circuit body formed by the load-dependent zero mobile compensation is consistent with that of the prior art, which is in accordance with the loop compensation that can form the load-dependent zero mobile compensation. It can be seen from the above description that for the LDO circuit body based on the load-dependent zero mobile compensation, when the load varies greatly or drastically, the loop is unstable.

The LDO circuit body based on the load-dependent zero mobile compensation generally includes PMOS transistors configured to follow load variations, such as the PMOS transistor MP6 in FIG. 3. PMOS transistor MP6 is utilized as a resistor and follows the load variations. The situation of utilizing the PMOS MP6 to follow the load variations of LDO circuit body based on the load-dependent zero mobile compensation is consistent with that of the prior art, which is well known for those who skilled in the art, and will not be described herein.

Figure 1:
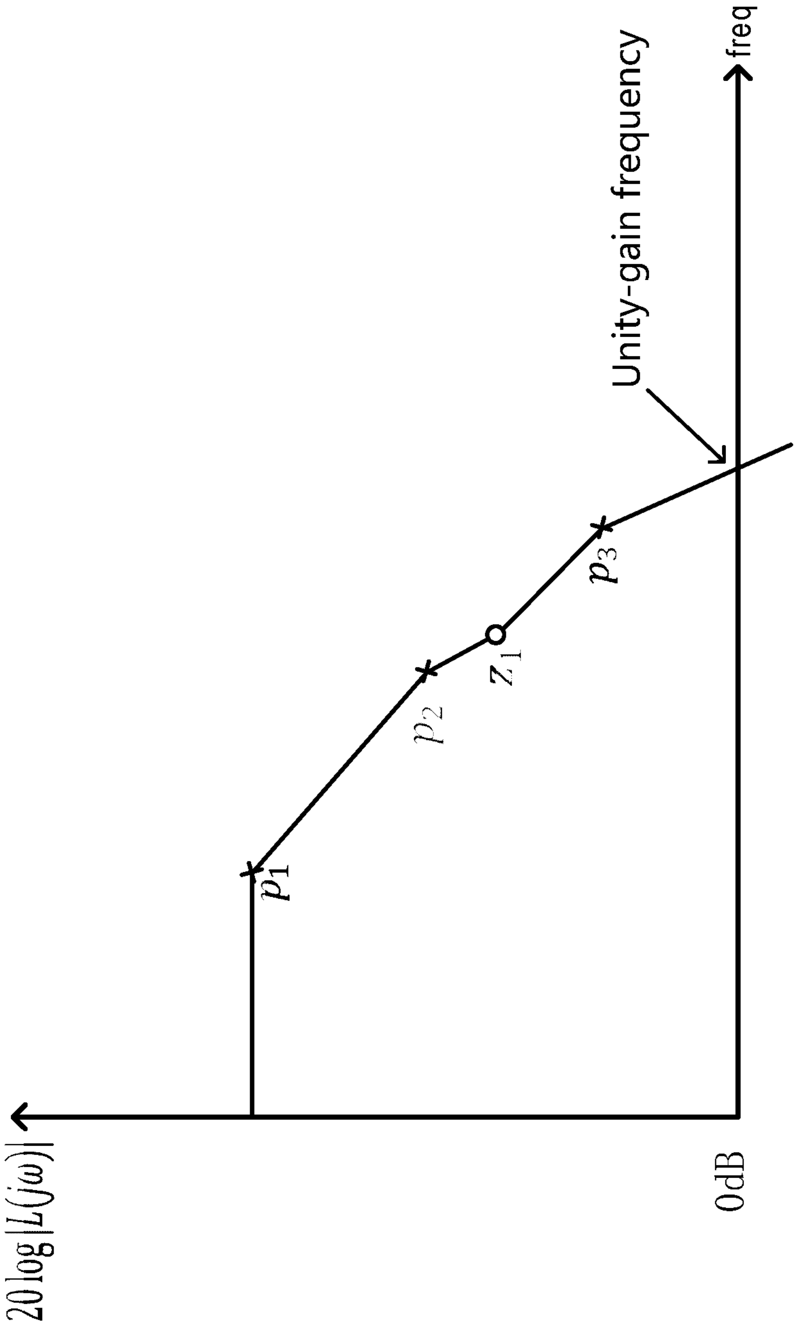
FIG. 1 illustrates a frequency diagram of the LDO circuit body when the load varies greatly or drastically.

FIG. 1 illustrates a frequency diagram of the LDO circuit body based on the load-dependent zero mobile compensation when the load is constant or varies little. In the figure, the horizontal coordinate denotes the frequency (unit is Hz), the vertical coordinate denotes the gain (20 lg|L(jω)|, unit is dB), ω denotes the angular frequency, and the relationship between the angular frequency aand the frequency f is: 2π*f=ω, the unit of the frequency f is Hz. p1 denotes the main pole of the LDO circuit body, p2 denotes the secondary pole of the LDO circuit body, z1 denotes the zero of the LDO circuit body, and p3 denotes the high frequency pole of the LDO circuit body. For an LDO circuit body, principal pole p1, secondary pole p2, high frequency pole p3, and zero z1 are all related to the configuration parameters the LDO circuit body. The specific correspondence, determination method and process of principal pole p1, secondary pole p2, high frequency pole p3, and zero point z1 of the LDO circuit body based on the load-dependent zero mobile compensation are consistent with the prior art.

The frequency of the high frequency pole p3 of the LDO circuit body is $f_{p3}$, then: $2\pi * f_{p3} = \omega_{p3}$. In general, the angular frequency $\omega_{p3}$ of the high frequency pole p3 is $$\omega_{p3} = \frac{1}{R_{MP6} C_1},$$

Figure 2:
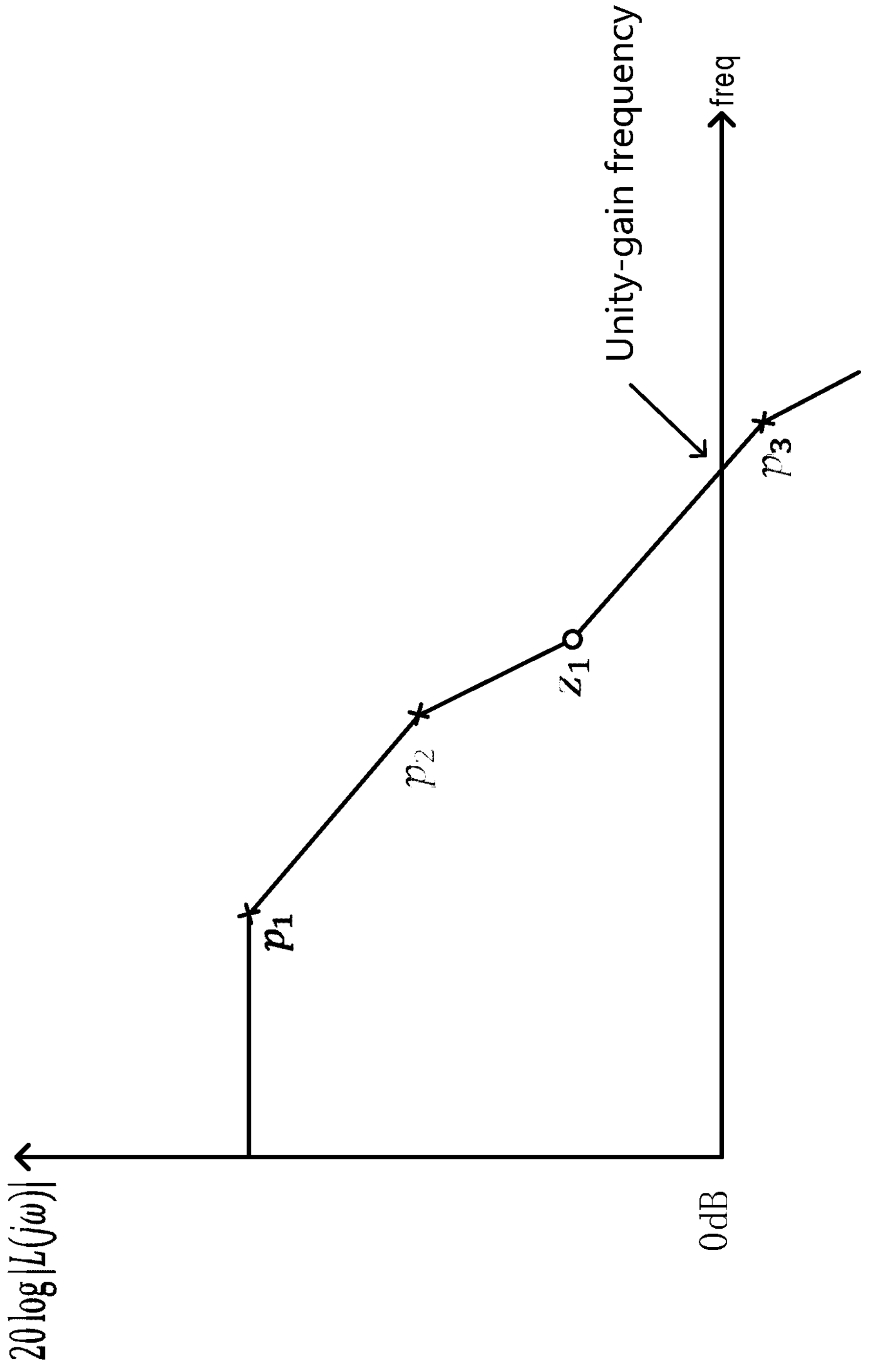
FIG. 2 illustrates a frequency diagram of the LDO circuit body when the load is constant or varies little.

$R_{MP6}$ is the resistance of PMOS transistor MP6 when varying with the load, $C_1$ is the equivalent capacitance of the LDO circuit body, and the specific situation of the equivalent capacitance of the LDO circuit body is consistent with that of the prior art. For example, for the circuit in FIG. 3, the equivalent capacitance $C_1$ is the equivalent parasitic capacitance between the output terminal of the main transport amplifier OPA and the input node of buffer Buffer. Therefore, the frequency $f_{p3}$ corresponding to the LDO circuit body can be determined according to the angular frequency $\omega_{p3}$ of the high frequency pole p3. In addition, there is also a corresponding unity-gain frequency in the LDO circuit body, namely, the unity-gain frequency as illustrated in FIG. 1 and FIG. 2. When the load is stable, those skilled in the art knows that PMOS transistor MP6 is in a linear operating region, and the resistance value for the PMOS transistor MP6 following the load variations and acting as the resistor is: $R_{MP6\text{-}linear}$; moreover, the frequency $f_{p3}$ of the high frequency pole p3 is greater than the unity-gain frequency $f_{unity\text{-}gain}$, as illustrated in FIG. 2.

When the load varies greatly or drastically, it is difficult for the PMOS transistor MP6 following the load variations and acting as a resistor to maintain in the linear region, instead, the PMOS transistor MP6 enters the saturation region, and then the resistance value for the PMOS transistor MP6 acting as the resistor varies from the linear region resistance value $R_{MP6\text{-}linear}$ to the saturation region resistance value $R_{MP6\text{-}linear}$. Since the saturation region resistance value $R_{MP6\text{-}linear}$ is greater than the linear region resistance value $R_{MP6\text{-}linear}$, the frequency $f_{p3}$ of the high frequency pole p3 shifts from outside of the unity-gain frequency to inside of the unity-gain frequency, thus eventually leading to the loss of loop stability, as illustrated in FIG. 1.

Therefore, when the load varies greatly or drastically, the operating interval of PMOS transistor MP6 in the LDO circuit can be varied, and then the frequency and angular frequency of the LDO circuit body can vary correspondingly. When the frequency of the LDO circuit body does not satisfy the stable condition of the zero-pole distribution of the LDO circuit after the load varies, the LDO circuit body can produce the problem of unrecoverable oscillations.

In order to avoid the loss of loop stability, in the embodiments of the present disclosure, a dynamic-resistance-boosting-circuit which is adaptively connected with PMOS transistor MP6 is configured. Specifically, when utilizing the PMOS transistor MP6 to follow the load variations of the LDO circuit body, the varying states of the load are represented according to the source-drain dropout voltage between the source terminal of the PMOS transistor MP6 and the drain terminal of the PMOS transistor MP6. When the varying state represented by the source-drain dropout voltage is matched with the preset load varying threshold in the dynamic-resistance-boosting-circuit, specifically, it means that the load is determined to be in a state of great or drastic variation according to the source-drain dropout voltage of the PMOS transistor MP6. Generally, when the source-drain dropout voltage is greater than or equal to the preset load varying threshold, a dynamically variable resistor in parallel with PMOS transistor MP6 is generated according to the varying state of the load in the dynamic-resistance-boosting-circuit.

In specific implementations, after the dynamic regulating resistance is generated by the dynamic-resistance-boosting-circuit, the dynamically variable resistor is connected in parallel with the PMOS transistor MP6 following the load variations and acting as a resistor to form a load equivalent resistor, the value for the formed load equivalent resistor is less than an equivalent resistance maximum value for the PMOS transistor MP6 in a stable loop state, so that a high frequency pole frequency of the LDO circuit body is greater than a unit gain frequency of the LDO circuit body.

In the embodiments of the present disclosure, the equivalent resistance maximum value for PMOS transistor MP6 in the stable loop state, specifically refers to the equivalent resistance value corresponding to PMOS transistor MP6 when the angular frequency of LDO circuit body is the unit-gain angular frequency. Specifically, the equivalent resistance maximum value $R_{MP6(max(\,))}$ for the PMOS transistor MP6 is as follows:

$$R\frac{1}{2\pi f_{unity-gain} C_{1_{MP6(max()}}},$$

where $f_{unity\text{-}gain}$ denotes the unit gain frequency corresponding to the unit-gain angular frequency. Therefore, for a definite LDO circuit body, the equivalent resistance maximum value $R_{MP6(max(\,))}$ for the PMOS transistor MP6 in the stable loop state can be determined specifically.

As can be seen from the above stability conditions of zero poles distribution, when the value for the formed load equivalent resistor is less than the equivalent resistance maximum value for the PMOS transistor MP6 in the stable loop state, the angular frequency $\omega_{p3}$ of the high frequency pole p3 is:

$$\omega_{p3} = \frac{1}{R_{Equal\_mos} C_1},$$

where $R_{Equal\_mos}$ denotes the value for the load equivalent resistor. When the value for the load equivalent resistor $R_{Equal\_mos}$ is less than the equivalent resistance maximum value $R_{MP6(max(\,))}$ for the PMOS transistor MP6 in the stable loop state, the angular frequency $\omega_{p3}$ of the high frequency pole p3 is greater than the unit-gain angular frequency, and the high frequency pole frequency $f_{p3}$ of the LDO circuit body is greater than the unit-gain frequency $f_{unity\text{-}gain}$ of the LDO circuit body.

In summary, in combination with FIG. 1 and FIG. 2, it can be seen that the value for the formed load equivalent resistor $R_{Equal\_mos}$ is less than the equivalent resistance maximum value $R_{MP6(max(\,))}$ for the PMOS transistor MP6 in the stable loop state, so that after the high frequency pole frequency $f_{p3}$ of the LDO circuit body being greater than the unit-gain frequency $f_{unity\text{-}gain}$ of the LDO circuit body, the stability condition of the LDO circuit body based on the load-dependent zero mobile compensation can be satisfied. When the load varies dramatically, the loop stability can be permanently maintained, the situations of unrecoverable oscillation are avoided, and the load response ability is improved.

Further, when the varying state of the load represented according to the source-drain dropout voltage is less than the preset load varying threshold in the dynamic-resistance-boosting-circuit, the PMOS transistor MP6 is in a linear operating region, and a dynamically variable resistor in a state of high resistance is generated according to the varying state of the load by the dynamic-resistance-boosting-circuit.

The resistance value for the dynamically variable resistor generated by the dynamic-resistance-boosting-circuit is much greater than the linear region resistance value for the PMOS transistor MP6 in the linear operating region.

In the embodiments of the present disclosure, when the varying state of the load represented by the source-drain dropout voltage is less than the preset load varying threshold in the dynamic-resistance-boosting-circuit, which indicates that the load connected to the LDO circuit body is constant or varies little. At this time, the PMOS transistor MP6 is in the linear operating region, and a dynamically variable resistor in a state of high resistance is generated according to the varying state of the load by the dynamic-resistance-boosting-circuit. The load is constant or varies little means that the above load is stable.

When the dynamically variable resistor is in a high resistance state, the resistance value for the current dynamically variable resistor is much greater than the linear region resistance value $R_{MP6\text{-}linear}$ for the PMOS transistor MP6 when the PMOS transistor MP6 is in a linear operating region, and the dynamically variable resistor with high resistance is in parallel with the linear region resistance value $R_{MP6\text{-}linear}$. According to the characteristics of the resistance in parallel, the value for the load equivalent resistor formed currently is less than and proximity to the linear region resistance value $R_{MP6\text{-}linear}$. Since the value $R_{Equal\_mos}$ for the load equivalent resistor is proximity to the linear region resistance value $R_{MP6\text{-}linear}$ for the PMOS transistor MP6 in the linear operating region, the operating state of the existing LDO circuit body based on the load-dependent zero mobile compensation can not be affected.

To sum up, when the load varies greatly or dramatically, a dynamically variable resistor in parallel with the PMOS transistor MP6 is generated by the dynamic-resistance-boosting-circuit according to the load varying states. The dynamically variable resistor is connected in parallel with the PMOS transistor MP6 following the load variations and acting as a resistor to form the load equivalent resistor with the value of $R_{Equal\_mos}$, the value for the formed load equivalent resistor $R_{Equal\_mos}$ is less than the equivalent resistance maximum value $R_{MP6(max(\ ))}$ for the PMOS transistor MP6 in the stable loop state, so that the high frequency pole frequency $f_{p3}$ of the LDO circuit body is greater than the unit-gain frequency $f_{unity\text{-}gain}$ of the LDO circuit body.

When the load is stable, the dynamically variable resistor of the dynamic-resistance-boosting-circuit exhibits a state of high resistance and the resistance value for the dynamically variable resistor generated by the dynamic-resistance-boosting-circuit is much greater than the linear region resistance value for the PMOS transistor MP6 in the linear operating region, and the corresponding value $R_{Equal\_mos}$ for the load equivalent resistor is proximity to the linear region resistance value $R_{MP6\text{-}linear}$ for the PMOS transistor MP6 in the linear operating region, which can not affect the operating state of the existing LDO circuit body based on the load-dependent zero mobile compensation, that is, can permanently maintain the loop stability of the LDO circuit body, improve the load response ability, and maintain safety and reliability.

As illustrated in FIG. 3, a specific implementation of the LDO circuit body based on the load-dependent zero mobile compensation is illustrated. Specifically, the LDO circuit body includes a compensation capacitor Cc connected with the drain terminal of the PMOS transistor MP6, one terminal of the compensation capacitor Cc is connected to the dynamic-resistance-boosting-circuit and the drain terminal of the PMOS transistor MP6, and another terminal of the compensation capacitor Cc is connected to an output terminal of a main operational amplifier OPA and an input terminal of a buffer Buffer.

The gate terminal of PMOS transistor MP6 is connected to a gate terminal of a PMOS transistor MP5, a drain terminal of the PMOS transistor MP5, a positive terminal of a bias current source IBIAS and a drain terminal of a NMOS transistor MN3; both a negative terminal of the bias current source IBIAS and a source terminal of the NMOS transistor MN3 are grounded.

A gate terminal of the NMOS transistor MN3 is connected to a gate terminal of a NMOS transistor MN1, a gate terminal of a NMOS transistor MN2, a drain terminal of the NMOS transistor MN2 and a drain terminal of a PMOS transistor MP3, and a source terminal of the NMOS transistor MN2 and a source terminal of the NMOS transistor MN1 are grounded; a drain terminal of the NMOS transistor MN1 is connected to a drain terminal of a PMOS transistor MP4, a gate terminal of the PMOS transistor MP4 and a gate terminal of the PMOS transistor MP3.

A source terminal of the PMOS transistor MP3 is connected to a drain terminal of a PMOS transistor MP2; a source terminal of the PMOS transistor MP4 is connected to a drain terminal of a PMOS transistor MP1 and a first terminal of resistance R1; the source terminal of the PMOS transistor MP4 is connected with the drain terminal of the PMOS transistor MP1 and the first terminal of the resistor R1 to form an output terminal VOUT of the LDO circuit body. A second terminal of a resistor R2 is connected to an in-phase terminal of the main operational amplifier OPA and one terminal of the resistor R2, and another terminal of the resistor R2 is grounded.

An output terminal of the buffer Buffer is connected to a gate terminal of the PMOS transistor MP2 and a gate terminal of the PMOS transistor MP1, and a reverse-phase terminal of the main operational amplifier OPA is connected to a reference voltage VREF.

In the embodiments of the present disclosure, the specific conditions of the main operational amplifier OPA, buffer Buffer and reference voltage VREF can all be consistent with those of the prior art, and the loop supplement conditions based on the load-dependent zero mobile compensation is consistent with those of the prior art, which will not be described herein.

Therefore, according to the LDO circuit body in FIG. 3, an ideal mathematical model of the value for the load equivalent resistor can be established, specifically:

$$R_{MP6(ideal)} = \begin{cases} \dfrac{1}{\sqrt{2\mu_p \alpha I_L C_{ox} \dfrac{(W/L)^2_{MP6}}{(W/L)_{MP5}}}} & \text{Load is stable} \\ < R_{MP6(max)} & \text{great changing state of the load} \end{cases},$$

where $R_{MP6(ideal)}$ denotes the value for the ideal load equivalent resistor, $$\left(\frac{W}{L}\right)_{MP5}$$

denotes the width-length ratio of the conductive channel of the PMOS transistor MP5, $$\left(\frac{W}{L}\right)_{MP6}$$

denotes the width-length ratio of the conductive channel of the PMOS transistor MP6, $\mu_p$ denotes the average mobility of the PMOS transistor MP6, and $\alpha$ denotes the shunt ratio, which is the current on the PMOS transistor MP5 divided by the current on the PMOS transistor MP1; $C_{ox}$ denotes the gate oxygen layer capacitance of the PMOS transistor MP6, $I_L$ denotes the current on PMOS transistor MP1, that is, the load current. The great varying state of the load means the load varies greatly or dramatically and the specific conditions can be referenced to the above description.

In order to satisfy the above ideal mathematical model of the value for the load equivalent resistor, the simplest attempt is to set up a resistance in parallel with the PMOS transistor MP6 in FIG. 3, and the resistance value $R_{parallel}$ for the parallel resistance satisfies:

$$R_{MP6-linear} = \sqrt{2\mu_p \alpha I_L C_{ox} \frac{(W/L)_{MP6}^2}{(W/L)_{MP5}}} \ll R_{parallel} < R_{MP6(max)}.$$

After the resistance is paralleled, the value $R_{Equal\_mos}$ for the load equivalent resistor that varies with the load is $R_{parallel}//R_{MP6}$. When the load is stable, the equivalent resistance corresponding to the PMOS transistor MP6 is $R_{MP6\text{-}linear}$. Since $R_{parallel}>>R_{MP6\text{-}linear}$, when the load varies greatly or drastically, due to the parallel of $R_{parallel}$, the equivalent resistance of the load is: $R_{Equal\_mos}=(R_{parallel}//R_{MP6\_}sat)<R_{MP6(max(\ ))}$.

However, such a design is obviously infeasible, this is due to that in light load, the linear resistance value for the PMOS transistor MP6 that varies with the load is $R_{MP6\text{-}linear}>10M\Omega$ (M here is 10^6, the same as below). Therefore, in order to satisfy $R_{Equal\_mos}\approx R_{MP6(max(\ ))}$, when the load is constant, it is necessary to enable $R_{parallel}>10R_{MP6\text{-}linear}>100M$, which may cause the instability of the loop by $R_{Equal\_mos}>R_{MP6(max(\ ))}$ when $R_{parallel}>R_{MP6(max(\ ))}$ and the load varies greatly or drastically. Assuming that a resistance with the suitable resistance value $R_{parallel}$ can be found and connected in parallel with PMOS transistor MP6 in FIG. 3, the above ideal mathematical model can be satisfied. Then, in the chip design, the area cost of a resistance device with a large resistance value is unacceptable.

In order to realize the above ideal mathematical model of the value for the above load equivalent resistor, another attempt can be made to parallel diodes at both terminals of the PMOS transistor MP6. By utilizing the paralleled diodes, although the requirements for $R_{dio}\geq R_{MP6\text{-}linear}$ can be satisfied when the load is constant and the dropout voltages at both terminals of the PMOS transistor MP6 is 0, the dropout voltage may be less than the on-off dropout voltage of the diodes when the load varies greatly or drastically and the PMOS transistor MP6 enters the saturation region, so as to play no role of $R_{Equal\_mos}=R_{dio}//R_{MP6\_sat}<R_{MP6(max(\ ))}$, where $R_{dio}$ denotes the equivalent resistance of the parallel diodes.

Even if the diode in parallel can satisfy the above requirements, when the diode is adopted in parallel with the PMOS transistor MP6 and the load varies greatly, in the conditions that the instantaneous required dropout voltage is greater than the on-off dropout voltage of the diode, the voltage clamp at the output point of the main operational amplifier OPA can not decrease as expected at each voltage, thereby resulting in unsatisfactory transient responses. For example, when the load suddenly increases significantly, the output voltage of the PMOS transistor MP6 in parallel with a diode can have a significant peak.

Therefore, in order to achieve the above ideal mathematical model of the value for the load equivalent resistor, the dynamic-resistance-boosting-circuit of the present disclosure includes a NMOS transistor MN4, an input terminal Input of the dynamic-resistance-boosting-circuit is formed by a gate terminal of the NMOS transistor MN4, and the input terminal Input of the dynamic-resistance-boosting-circuit is adaptively connected to the drain terminal of the PMOS transistor MP6.

A source terminal of the NMOS transistor MN4 is connected to a positive terminal of a current source I0 and a first terminal of a resistance R0, a negative terminal of the current source I0 is grounded or floated on the ground, a drain terminal of a NMOS transistor MN1 is connected to an input voltage VIN, a positive terminal of a current source I1, a first terminal of a resistance R3, a source terminal of a PMOS transistor MP10, and a source terminal of a PMOS transistor MP11.

A negative terminal of the current source I1 is connected to a second terminal of the resistance R0 and a gate terminal of a PMOS transistor MP7; a source terminal of the PMOS transistor MP7 is connected to a second terminal of the resistance R3; a drain terminal of the PMOS transistor MP7 is connected to a drain terminal of a PMOS transistor MP8, a gate terminal of the PMOS transistor MP8 and a gate terminal of a PMOS transistor MP9, and both a source terminal of the PMOS transistor MP8 and a source terminal of the PMOS transistor MP9 are grounded; a drain terminal of the PMOS transistor MP9 is connected to a drain terminal of a PMOS transistor MP10, a gate terminal of the PMOS transistor MP10 and a gate terminal of a PMOS transistor MP11; an output terminal Output of the dynamic-resistance-boosting-circuit is formed by a drain terminal of the PMOS transistor MP11, and the output terminal Output of the dynamic-resistance-boosting-circuit is adaptively connected to the drain terminal of the PMOS transistor MP6.

Specifically, the preset load varying threshold is I1*R0, and when the represented varying state of the load is matched with the preset load varying threshold in the dynamic-resistance-boosting-circuit, the source-drain dropout voltage is greater than or equal to I1*R0. The floating on the ground means that the relative level is at a low level, the absolute potential is not 0, and the conditions of floating on the ground is consistent with those of the prior art, which will not describe in detail herein.

Figure 4:
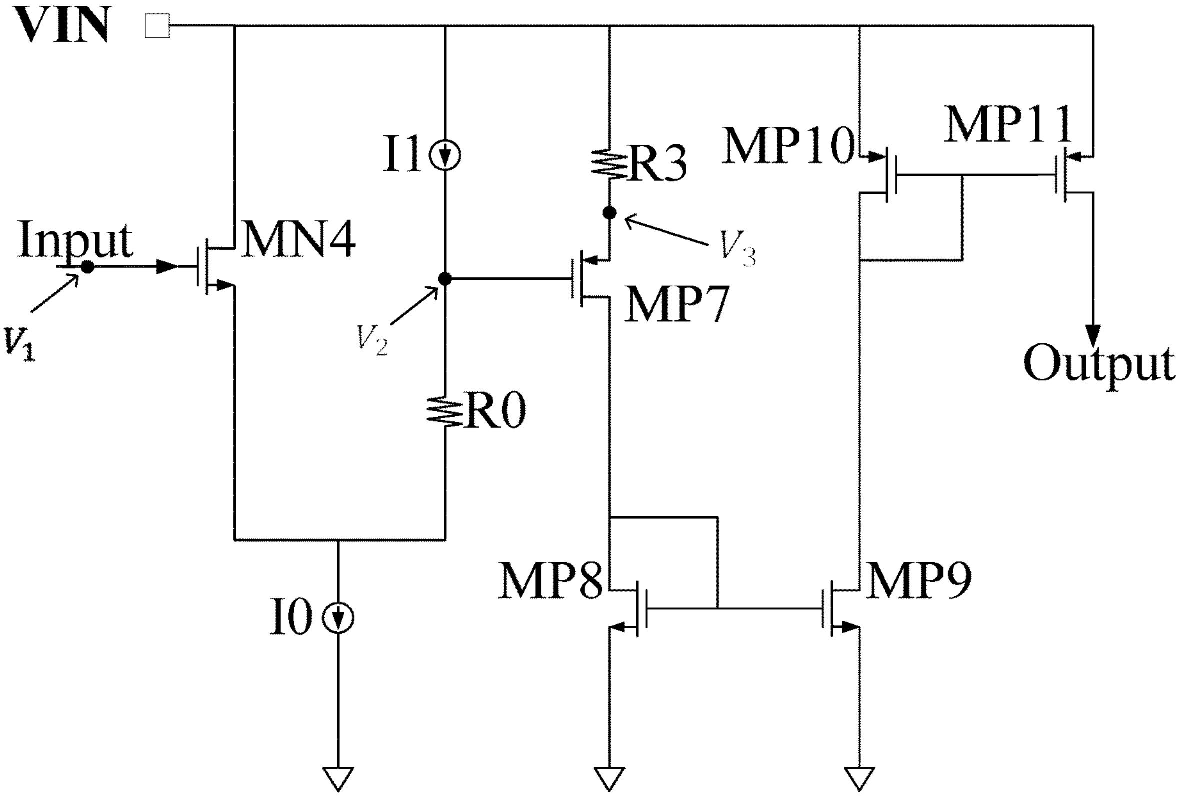
FIG. 4 illustrates a circuit schematic diagram of the dynamic-resistance-boosting-circuit in the present disclosure.

As can be seen from FIG. 4, the dynamic-resistance-boosting-circuit is a circuit with voltage input and current output. The conditions for outputting current of the dynamic-resistance-boosting-circuit are as follows: $V_3-V_2\geq|V_{thp}|$, where $V_3$ denotes the voltage of the source terminal of the PMOS transistor MP7 in FIG. 4, $V_2$ denotes the voltage loaded to the gate terminal of the PMOS transistor MP7 in FIG. 4, $|V_{thp}|$ denotes the threshold voltage of the PMOS transistor MP7 in FIG. 4. When there is no output current at the output terminal, $V_3$ is approximate to VIN, and $V_2=V_1-V_{thn}+$I1*R0, where $V_1$ denotes the voltage loaded to the gate terminal of the NMOS transistor MN4, $V_{thn}$ denotes the threshold voltage of the NMOS transistor MN4, and $I_1$ denotes the current value for the current source I1.

At the same time, $V_{thn}-|V_{thp}|<<$I1*R0. Therefore, it can be obtained that when the current is output by the output terminal Output of the dynamic-resistance-boosting-circuit, it needs to meet: $V_1\leq$VIN−I1*R0.

It can be further understood that: when the source-drain dropout voltage VIN−$V_1$ of the source terminal of the PMOS transistor MP6 and the drain terminal of the PMOS transistor MP6 is less than I1*R0, the output terminal Output of the dynamic-resistance-boosting-circuit has no output current, when the dropout voltage VIN−$V_1$ at two terminals of the PMOS transistor MP6 is greater than I1*R0, output current can be generated by the output terminal Output of the dynamic-resistance-boosting-circuit. For ease of expression, the dropout voltage VIN−$V_1$ at two terminals of the PMOS transistor MP6 is set as ΔV.

When the load is constant or varies little, that is, when the load is stable and ΔV<I1*R0, there is no current out of the output terminal Output of the dynamic-resistance-boosting-circuit, and the value $R_{DRBC}$ for the dynamically variable resistor equivalent parallel at two terminals of PMOS transistor MP6 is:

$$R_{DRBC} = \frac{\Delta V}{\sim 0} \gg R_{MP6\text{-}linear}.$$

When the load varies greatly or drastically, ΔV≥I1*R0, the current out of the output terminal Output of the dynamic-resistance-boosting-circuit is:

$$I_{out} = \frac{\Delta V - I1 * R0}{R3} \times \frac{\left(\frac{W}{L}\right)_{MP9}}{\left(\frac{W}{L}\right)_{MP8}} \times \frac{\left(\frac{W}{L}\right)_{MP11}}{\left(\frac{W}{L}\right)_{MP10}}.$$

When the load varies greatly or drastically, ΔV≥I1*R0, therefore the current out of the output terminal Output of the dynamic-resistance-boosting-circuit can be simplified as:

$$I_{out} = \frac{\Delta V}{R3} \times \frac{\left(\frac{W}{L}\right)_{MP9}}{\left(\frac{W}{L}\right)_{MP8}} \times \frac{\left(\frac{W}{L}\right)_{MP11}}{\left(\frac{W}{L}\right)_{MP10}}.$$

At this time, the value $R_{DRBC}$ for the dynamically variable resistor equivalent parallel at two terminals of PMOS transistor MP6 is:

$$R_{DRBC} = \frac{\Delta V}{I_{out}} = R3 * \frac{\left(\frac{W}{L}\right)_{MP8}}{\left(\frac{W}{L}\right)_{MP9}} \times \frac{\left(\frac{W}{L}\right)_{MP10}}{\left(\frac{W}{L}\right)_{MP11}},$$

where $$\left(\frac{W}{L}\right)_{MP9}$$

denotes the width-length ratio of the conductive channel of the PMOS transistor MP9, $$\left(\frac{W}{L}\right)_{MP8}$$

denotes the width-length ratio of the conductive channel of the PMOS transistor MP8, $$\left(\frac{W}{L}\right)_{MP11}$$

denotes the width-length ratio of the conductive channel of the PMOS transistor MP11, $$\left(\frac{W}{L}\right)_{MP10}$$

denotes the width-length ratio of the conductive channel of the PMOS transistor MP10, and $$\frac{\left(\frac{W}{L}\right)_{MP8}}{\left(\frac{W}{L}\right)_{MP9}} \times \frac{\left(\frac{W}{L}\right)_{MP10}}{\left(\frac{W}{L}\right)_{MP11}}$$

denotes the magnification β of the resistance R3, which can be adjusted in the design to satisfy βR3<$R_{MP6(max( ))}$. Preferably, 0.27RMP6(max)<βR3<0.53RMP6(max).

Therefore, through the dynamic-resistance-boosting-circuit, the stability compensation of the loop can be achieved at the minimum cost without affecting the resistance that varies with the load when the load is stable. When the load varies greatly or drastically, it is ensured that the value $R_{Equal\_mos}$ for the load equivalent resistor is less than the equivalent resistance maximum value $R_{MP6(max( ))}$ for the PMOS transistor MP6 in the stable loop state, so as to ensure the loop stability of the LDO circuit body and a stable transition of the output voltage.

In summary, a method of a low-dropout regulator circuit with high loop stability based on a load-dependent zero mobile compensation can be obtained. Specifically, an LDO circuit body based on the load-dependent zero mobile compensation is provided, which includes PMOS transistor MP6 configured to follow load variations.

A dynamic-resistance-boosting-circuit adaptively connected with the PMOS transistor MP6 is provided, for the load adaptively connected to the LDO circuit body, varying states of the load are represented according to the source-drain dropout voltage between a source terminal of the PMOS transistor MP6 and a drain terminal of the PMOS transistor MP6; when the represented varying state of the load is matched with a preset load varying threshold in the dynamic-resistance-boosting-circuit, a dynamically variable resistor in parallel with the PMOS transistor MP6 is generated according to the varying state of the load by the dynamic-resistance-boosting-circuit.

The dynamically variable resistor is connected in parallel with the resistor followed by the PMOS transistor MP6 and acting as a resistor to form a load equivalent resistor, the value for the formed load equivalent resistor is less than an equivalent resistance maximum value for the PMOS transistor MP6 in a stable loop state, so that a high frequency pole frequency of the LDO circuit body is greater than a unit gain frequency of the LDO circuit body.

When the varying state of the load represented according to the source-drain dropout voltage is less than the preset load varying threshold in the dynamic-resistance-boosting-circuit, the PMOS transistor MP6 is in a linear operating region, and a dynamically variable resistor in a state of high resistance is generated according to the varying state of the load by the dynamic-resistance-boosting-circuit.

The resistance value for the dynamically variable resistor generated by the dynamic-resistance-boosting-circuit is much greater than a linear region resistance value for PMOS transistor MP6 in the linear operating region.

In the embodiments of the present disclosure, the LDO circuit body, the PMOS transistor MP6, the dynamic-resistance-boosting-circuit, the source-drain dropout voltage of the PMOS transistor MP6 all can be referred to the above descriptions, and the adjustment method and process to ensure the loop stability of the LDO circuit body can be referred to the above descriptions, which will not be described in detail herein.

Obviously, a person who skilled in the art may make various alterations and variants of the present disclosure without deviating from the spirit and scope of the present disclosure. Thus, to the extent that these modifications and variations of the present disclosure are within the scope of the claims of the present disclosure and their equivalents, the present disclosure is also intended to include such modifications and variations.

Beneficial effects of the present disclosure are as follows.

The present disclosure provides a low-dropout regulator circuit with high loop stability based on a load-dependent zero mobile compensation and a method thereof. When the load varies greatly or drastically, a dynamically variable resistor in parallel with the PMOS transistor MP6 is generated according to the varying states of the load by the dynamic-resistance-boosting-circuit; the dynamically variable resistor is connected in parallel with the PMOS transistor MP6 following the load variations and acting as a resistor to form a load equivalent resistor, the value for the formed load equivalent resistor is less than an equivalent resistance maximum value for the PMOS transistor MP6 in a stable loop state, so that a high frequency pole frequency of the LDO circuit body is greater than a unit gain frequency of the LDO circuit body.

When the load is stable, the dynamically variable resistor of the dynamic-resistance-boosting-circuit exhibits a state of high resistance and the resistance value for the dynamically variable resistor generated by the dynamic-resistance-boosting-circuit is much greater than the linear region resistance value for the PMOS transistor MP6 in the linear operating region, which can not affect the operating state of the existing LDO circuit body based on the load-dependent zero mobile compensation, that is, can permanently maintain the loop stability of the LDO circuit body, improve the load response ability, and maintain safety and reliability.

What is claimed is:

1. A low-dropout regulator (LDO) circuit with high loop stability based on a load-dependent zero mobile compensation, wherein the LDO circuit with high loop stability comprises a LDO circuit body based on the load-dependent zero mobile compensation, the LDO circuit body includes a first PMOS transistor configured to follow load variations; the LDO circuit with high loop stability further comprises a dynamic-resistance-boosting-circuit adaptively connected with the first PMOS transistor; for a load adaptively connected to the LDO circuit body, varying states of the load are represented according to a source-drain dropout voltage between a source terminal of the first PMOS transistor and a drain terminal of the first PMOS transistor, when the represented varying state of the load is matched with a preset load varying threshold in the dynamic-resistance-boosting-circuit, a dynamically variable resistor in parallel with the first PMOS transistor is generated according to the varying state of the load by the dynamic-resistance-boosting-circuit;

the dynamically variable resistor is connected in parallel with the first PMOS transistor following the load variations and acting as a resistor to form a load equivalent resistor, wherein a value for the formed load equivalent resistor is less than an equivalent resistance maximum value for the first PMOS transistor in a stable loop state, so that a high frequency pole frequency of the LDO circuit body is greater than a unit gain frequency of the LDO circuit body.

2. The low-dropout regulator circuit with high loop stability based on the load-dependent zero mobile compensation according to claim 1, wherein, when the varying state of the load represented according to the source-drain dropout voltage is less than the preset load varying threshold in the dynamic-resistance-boosting-circuit, the first PMOS transistor is in a linear operating region, and a dynamically variable resistor in a state of high resistance is generated according to the varying state of the load by the dynamic-resistance-boosting-circuit; wherein a resistance value for the dynamically variable resistor generated by the dynamic-resistance-boosting-circuit is much greater than a linear region resistance value for the first PMOS transistor in the linear operating region.

3. The low-dropout regulator circuit with high loop stability based on the load-dependent zero mobile compensation according to claim 2, wherein the dynamic-resistance-boosting-circuit includes a first NMOS transistor, an input terminal of the dynamic-resistance-boosting-circuit is formed by a gate terminal of the first NMOS transistor, and the input terminal of the dynamic-resistance-boosting-circuit is adaptively connected to the drain terminal of the first PMOS transistor;

a source terminal of the first NMOS transistor is connected to a positive terminal of a first current source and a first terminal of a first resistance, a negative terminal of the first current source is grounded or floated on the ground, a drain terminal of a first NMOS transistor is connected to an input voltage, a positive terminal of a second current source, a first terminal of a second resistance, a source terminal of a second PMOS transistor, and a source terminal of a third PMOS transistor;

a negative terminal of the second current source is connected to a second terminal of the first resistance and a gate terminal of a fourth PMOS transistor; a source terminal of the fourth PMOS transistor is connected to a second terminal of the second resistance; a drain terminal of the fourth PMOS transistor is connected to a drain terminal of a fifth PMOS transistor, a gate terminal of the fifth PMOS transistor and a gate terminal of a sixth PMOS transistor, and both a source terminal of the fifth PMOS transistor and a source terminal of the sixth PMOS transistor are grounded; a drain terminal of the sixth PMOS transistor is connected to a drain terminal of a second PMOS transistor, a gate terminal of the second PMOS transistor and a gate terminal of a third PMOS transistor; an output terminal of the dynamic-resistance-boosting-circuit is formed by a drain terminal of the third PMOS transistor, and the output terminal of the dynamic-resistance-boosting-circuit is adaptively connected to the drain terminal of the first PMOS transistor.

4. The low-dropout regulator circuit with high loop stability based on the load-dependent zero mobile compensation according to claim 3, wherein the preset load varying threshold is I1*R0, and when the represented varying state of the load is matched with the preset load varying threshold in the dynamic-resistance-boosting-circuit, the source-drain dropout voltage is greater than or equal to I1*R0, wherein I1 is a current of the second current source and R0 is the first resistance.

5. The low-dropout regulator circuit with high loop stability based on the load-dependent zero mobile compensation according to claim 1, wherein the LDO circuit body includes a compensation capacitor connected with the drain terminal of the first PMOS transistor, one terminal of the compensation capacitor is connected to the dynamic-resistance-boosting-circuit and the drain terminal of the first PMOS transistor, and another terminal of the compensation capacitor is connected to an output terminal of a main operational amplifier and an input terminal of a buffer;

the gate terminal of the first PMOS transistor is connected to a gate terminal of a seventh PMOS transistor, a drain terminal of the seventh PMOS transistor, a positive terminal of a bias current source and a drain terminal of a second NMOS transistor; both a negative terminal of the bias current source and a source terminal of the second NMOS transistor are grounded;

a gate terminal of the second NMOS transistor is connected to a gate terminal of a first NMOS transistor, a gate terminal of a third NMOS transistor, a drain terminal of the third NMOS transistor and a drain terminal of an eighth PMOS transistor, and a source terminal of the third NMOS transistor and a source terminal of the first NMOS transistor are grounded; a drain terminal of the first NMOS transistor is connected to a drain terminal of a ninth PMOS transistor, a gate terminal of the ninth PMOS transistor and a gate terminal of the eighth PMOS transistor;

a source terminal of the eighth PMOS transistor is connected to a drain terminal of a tenth PMOS transistor; a source terminal of the ninth PMOS transistor is connected to a drain terminal of an eleventh PMOS transistor and a first terminal of a third resistance; wherein, the source terminal of the ninth PMOS transistor is connected with the drain terminal of the eleventh PMOS transistor and the first terminal of the third resistance to form an output terminal of the LDO circuit body; a second terminal of a fourth resistance is connected to an in-phase terminal of the main operational amplifier and one terminal of the fourth resister resistance, and another terminal of the fourth resister resistance is grounded;

an output terminal of the buffer is connected to a gate terminal of the tenth PMOS transistor and a gate terminal of the eleventh PMOS transistor, and a reverse-phase terminal of the main operational amplifier is connected to a reference voltage.

6. A method of providing a low-dropout regulator circuit with high loop stability based on a load-dependent zero mobile compensation, providing a LDO circuit body based on the load-dependent zero mobile compensation, wherein the LDO circuit body includes a first PMOS transistor configured to follow load variations;

providing a dynamic-resistance-boosting-circuit adaptively connected with the first PMOS transistor, representing, for a load adaptively connected to the LDO circuit body, varying states of the load according to a source-drain dropout voltage between a source terminal of the first PMOS transistor and a drain terminal of the first PMOS transistor; generating, when the represented varying state of the load is matched with a preset load varying threshold in the dynamic-resistance-boosting-circuit, a dynamically variable resistor in parallel with the first PMOS transistor according to the varying state of the load by the dynamic-resistance-boosting-circuit; and connecting the dynamically variable resistor in parallel with the first PMOS transistor following the load variations and acting as a resistor to form a load equivalent resistor, wherein a value for the formed load equivalent resistor is less than an equivalent resistance maximum value for first PMOS transistor in a stable loop state, so that a high frequency pole frequency of the LDO circuit body is greater than a unit gain frequency of the LDO circuit body.

7. The method of the low-dropout regulator circuit with high loop stability based on the load-dependent zero mobile compensation according to claim 6, wherein, when the varying state of the load represented according to the source-drain dropout voltage is less than the preset load varying threshold in the dynamic-resistance-boosting-circuit, the first PMOS transistor is in a linear operating region, and a dynamically variable resistor in a state of high resistance is generated according to the varying state of the load by the dynamic-resistance-boosting-circuit;

a resistance value for the dynamically variable resistor generated by the dynamic-resistance-boosting-circuit is much greater than a linear region resistance value for first PMOS transistor in the linear operating region.

8. The method of the low-dropout regulator circuit with high loop stability based on the load-dependent zero mobile compensation according to claim 7, wherein the dynamic-resistance-boosting-circuit includes a first NMOS transistor, an input terminal of the dynamic-resistance-boosting-circuit is formed by a gate terminal of the first NMOS transistor, and the input terminal of the dynamic-resistance-boosting-circuit is adaptively connected to the drain terminal of the first PMOS transistor;

a source terminal of the first NMOS transistor is connected to a positive terminal of a first current source and a first terminal of a first resistance, a negative terminal of the first current source is grounded or floated on the ground, a drain terminal of a first NMOS transistor is connected to an input voltage VIN, a positive terminal of a second current source, a first terminal of a second resistance, a source terminal of a second PMOS transistor, and a source terminal of a third PMOS transistor;

a negative terminal of the second current source is connected to a second terminal of the first resistance and a gate terminal of a fourth PMOS transistor; a source terminal of the fourth PMOS transistor is connected to a second terminal of the second resistance; a drain terminal of the fourth PMOS transistor is connected to a drain terminal of a fifth PMOS transistor, a gate terminal of the fifth PMOS transistor and a gate terminal of a sixth PMOS transistor, and both a source terminal of the fifth PMOS transistor and a source terminal of the sixth PMOS transistor are grounded; a drain terminal of the sixth PMOS transistor is connected to a drain terminal of a second PMOS transistor, a gate terminal of the second PMOS transistor and a gate terminal of a third PMOS transistor; an output terminal of the dynamic-resistance-boosting-circuit is formed by a drain terminal of the third PMOS transistor, and the output terminal of the dynamic-resistance-boosting-circuit is adaptively connected to the drain terminal of the first PMOS transistor.

9. The method of the low-dropout regulator circuit with high loop stability based on the load-dependent zero mobile compensation according to claim 8, wherein the preset load varying threshold is I1*R0, and when the represented varying state of the load is matched with the preset load varying threshold in the dynamic-resistance-boosting-circuit, the source-drain dropout voltage is greater than or equal to I1*R0, wherein I1 is a current of the second current source and R0 is the first resistance.

10. The method of the low-dropout regulator circuit with high loop stability based on the load-dependent zero mobile compensation according to claim 6, wherein the LDO circuit body includes a compensation capacitor connected with the drain terminal of the first PMOS transistor, one terminal of the compensation capacitor is connected to the dynamic-resistance-boosting-circuit and the drain terminal of the first PMOS transistor, and another terminal of the compensation capacitor is connected to an output terminal of a main operational amplifier and an input terminal of a buffer;

the gate terminal of the first PMOS transistor is connected to a gate terminal of a seventh PMOS transistor, a drain terminal of the seventh PMOS transistor, a positive terminal of a bias current source and a drain terminal of a second NMOS transistor; both a negative terminal of the bias current source and a source terminal of the second NMOS transistor are grounded;

a gate terminal of the second NMOS transistor is connected to a gate terminal of a first NMOS transistor, a gate terminal of a third NMOS transistor, a drain terminal of the third NMOS transistor and a drain terminal of a eighth PMOS transistor, and a source terminal of the third NMOS transistor and a source terminal of the first NMOS transistor are grounded; a drain terminal of the first NMOS transistor is connected to a drain terminal of a ninth PMOS transistor, a gate terminal of the ninth PMOS transistor and a gate terminal of the eighth PMOS transistor;

a source terminal of the eighth PMOS transistor is connected to a drain terminal of a tenth PMOS transistor; a source terminal of the ninth PMOS transistor is connected to a drain terminal of a eleventh PMOS transistor and a first terminal of a third resistance; wherein, the source terminal of the ninth PMOS transistor is connected with the drain terminal of the eleventh PMOS transistor and the first terminal of the third resistance to form an output terminal VOU-T of the LDO circuit body; a second terminal of a fourth resistance is connected to an in-phase terminal of the main operational amplifier and one terminal of the fourth resistance, and another terminal of the fourth resistance is grounded;

an output terminal of the buffer is connected to a gate terminal of the tenth PMOS transistor and a gate terminal of the eleventh PMOS transistor, and a reverse-phase terminal of the main operational amplifier is connected to a reference voltage.

* * * * *